Figure 1:
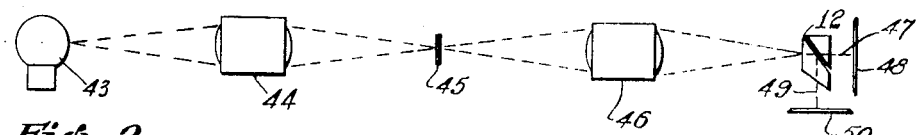

Jan. 29, 1935.  E. R. HARPER  1,989,317
OPTICAL SYSTEM
Filed Aug. 31, 1931   2 Sheets-Sheet 1

INVENTOR
Earle R. Harper.
BY
ATTORNEY

Jan. 29, 1935.  E. R. HARPER  1,989,317
OPTICAL SYSTEM
Filed Aug. 31, 1931  2 Sheets-Sheet 2

INVENTOR
Earle R. Harper.
BY
ATTORNEY

Patented Jan. 29, 1935

1,989,317

UNITED STATES PATENT OFFICE 1,989,317

OPTICAL SYSTEM

Earle R. Harper, Los Angeles, Calif.

Application August 31, 1931, Serial No. 560,264

4 Claims. (Cl. 88—1)

This invention relates to optical systems for projection machines and cameras. Specifically, the invention contemplates the provision of a novel optical system whereby a given beam of light, in the case of a projection machine, may be directed in two given paths without appreciable light intensity loss.

Another object is the provision of an optical system for projection machines or cameras adapted to project or photograph a given scene in two paths without appreciable loss of definition.

Another object is the provision of an optical system for projection machines and cameras adapted to split a given image in different paths without distortion or the production of Newton rings.

Another object is the provision of an optical system for projection machines and cameras adapted to split the light path and without the necessity of interposing prisms provided with silvered or platinumized surfaces.

Another object is the provision of an optical system adapted to be utilized in conjunction with a projection machine in such a manner that a given scene or plurality of scenes, such as employed for the ordinary motion picture camera, may be projected upon a main view screen in a theatre and, at the same time, the same scene may be projected upon a second screen located at some remote point.

With respect to the foregoing object, it may be said that a theatre may project a given motion picture sequence upon the main screen of said theatre and, for the purpose of advertising the motion picture being projected, a small projection screen may be located in the theatre lobby or in some store near the theatre, and upon which small screen at the will of the operator, certain scenes from said picture may appear. The purpose, of course, is to stimulate interest in the particular motion picture being projected.

Another object is the provision of an optical system for projection machines, cameras, and the like, which is adaptable for television purposes. In this connection, television pictures could be transmitted through television channels at the same time that the same picture was being projected on a screen.

Another object of the invention is the provision of an optical system for projection machines which is adaptable for sound in conjunction with a picture being projected through said system.

Other objects of the invention will appear as the specification proceeds, among which is the provision of an optical system which is simple of construction, inexpensive in cost of manufacture, and efficient in operation.

With the above and other objects in view, the invention consists in the novel and useful provision, formation, construction, association, and relative arrangement of parts, members, and features, all as shown in certain embodiments in the accompanying drawings, described generally, and more particularly pointed out in the claims.

Figure 2:
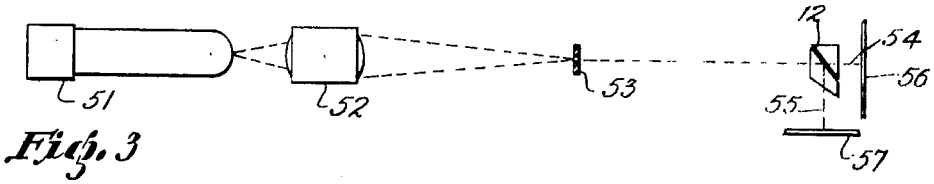
Figure 3:
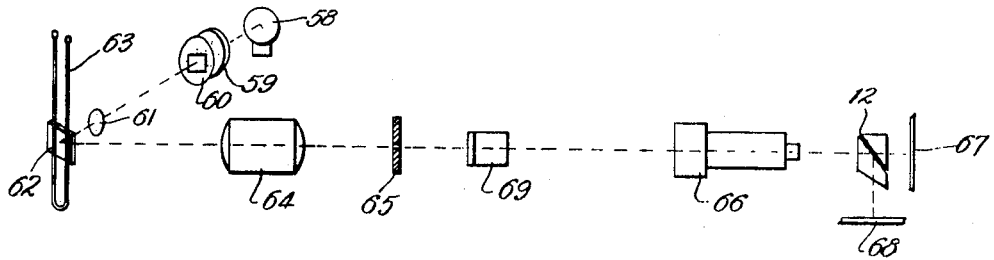
Figure 4:
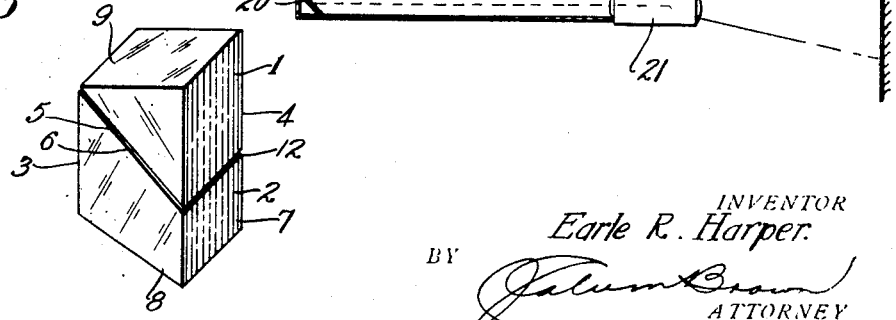
Figure 5:
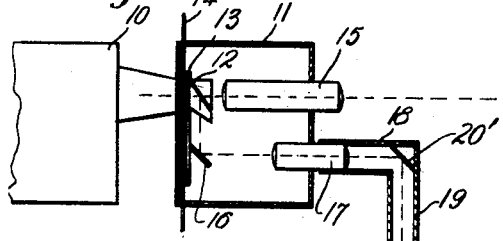
Figure 6:
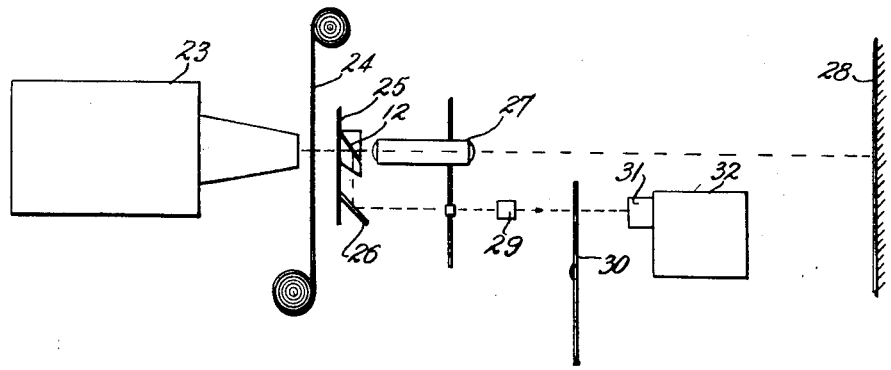
Figure 7:
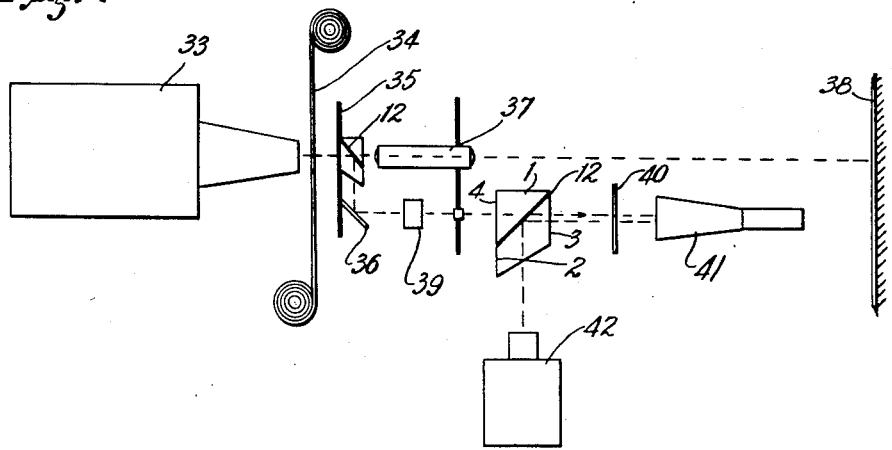

In the drawings:

Figures 1, 2 and 3 diagrammatically illustrate three different systems for dual negative sound recording incorporating the optical system of the invention, Figure 4 is a diagrammatic view of a dual projection system incorporating the optical system of the invention, Figure 5 is a perspective view of certain elements of the optical system, Figure 6 is a diagrammatic view of a television system together with a motion picture projection system incorporating the optical system, and Figure 7 is a diagrammatic view of a motion picture projection and television system operating through the medium of a cathode ray tube, and likewise incorporating the optical system of the invention.

Referring now to the drawings, and particularly to Figure 5, I have therein illustrated in perspective an element of the invention adapted to direct beams of light from a source in two or more directions. The same includes a pair of prisms 1 and 2, which may be formed of glass, such as crown or flint, although both prisms are formed of the same character of glass. I have so arranged the said prisms that when a beam of light is directed against the surface 3 of the prism 2, said beam of light will pass directly through both prisms and outwardly from the surface 4 of the prism 1, as well as having a beam of light directed downwardly relative to the surfaces 5 and 6 of the prisms 1 and 2, respectively. I have accomplished this desired function in the present invention without the necessity of silvering or platinumizing either one of the surfaces 5 or 6 of the respective prisms. For purposes of explanation, I may state that the prism 2 has the faces 7 and 3 substantially parallel and that the angle between the face 7 and the base 8 is substantially 54°, and the angle between the face 6 and the face 3 is 38°. Therefore, the angle between the base 8 and the face 3 would be 126° and the angle between the faces 6 and 7 would be 142°. With respect to the prism 1, the angle between the faces 4 and 5 is 38° and the angle between the top face 9 and the face 5 is 52°. Therefore, the angle between the faces 1 and 9 is 90°. The two prisms are not cemented together and the faces 5 and 6 are contiguous and slightly spaced apart substantially .002 of an inch, although this spacing may vary under different conditions of use and service. The angles given for the faces of the two prism members is based upon the consideration that crown glass is used. If flint glass is used, there would be a slight change in the degrees between the faces. For instance, in place of 54° for the angular spacing between the faces 7 and 8, the angle would become 51° and the other angles would be changed accordingly. The principle of angularity between the different faces of the two prisms is based upon certain considerations relative to the index of the glass used. I have found in the case of crown glass that the use of 38° between the faces 3 and 5 of the prism 2 will necessitate the angle of 54° between the base 8 and the face 3 to project a reflected beam at right angles to the main beam of light. At 38°, the light loss on the main beam does not exceed 5 per cent. From 39° to 40°, a color fringe enters and in increasing proportion so that at 43°, a color band almost entirely covers the prism surfaces. Of course, this does not occur when the reflecting surfaces are silvered and then cemented, as in the case of an ordinary beam splitter. This invention, as before stated, is not to be confused with the well known so-called beam splitters, in that said beam splitters are silvered or provided with some metalized surface to provide a reflecting medium, and then the glass elements, usually prisms, are cemented together. In my invention, the angles employed between the two prisms and the general characteristics of the glass employed, cause the prism surface, to-wit, the surface 6, to become the reflecting medium.

In actual practice, I have found that German crown glass (Shott-Jena) with an index at D line 1.5168 and dispersion 63.9 is satisfactory. I may also use flint glass having an index of 1.61. I have also found that the ordinary type of beam splitter waste from 25 per cent. to 50 per cent. of the light in the main projection beam because of the silvered or platinumized surface although the secondary beam is normal. In my invention, not more than 5 per cent. by actual test, of the light is lost in main projection and the secondary beam is normal. It is for this reason that the present invention is capable of producing remarkable results for the various purposes outlined in the objects. Furthermore, in actual operation, the surfaces 5 and 6 are separated in order that the prisms may expand under heat without the surfaces 5 and 6 contacting, which might produce Newton rings.

Referring to Figure 4, I have shown an adaptation of the invention for use in motion picture theatres. In this adaptation of the invention, 10 is a source of light, 11 is a projection head within which is suitably held in a mounting the optical device comprising the two prisms 1 and 2, shown in Figure 5, and which for convenience, will now be given the number 12 as indicating both said prisms when held in the position shown in Figure 5. The said prisms 1 and 2 are preferably mounted adjacent the film gate 13 and the strip of film 14 is adapted to be passed between the film gate and the source of light 10. In alignment with the face 4 of the prism 1 is a main lens 15. This lens is adapted to project a picture on the film onto the main screen in a theatre. Mounted below the face 8 at any suitable distance and at substantially 45° to the face 3 of the prism 2 is a mirror 16. This mirror is preferably formed of metal and has an optically true reflecting surface. In this respect, it is also necessary that the different surfaces of the prism combination should be optical flats. 17 is a reduction lens. This lens is placed within a tubing 18. The number of bends or turns given this tubing will depend upon actual use and crcumstance, and in the present instance, said tube is right-angularly bent, as shown at 19 and 20. At each right angle is placed a reflecting surface 20' mounted substantially at 45°. The end of the tubing is provided with a projection lens 21, and the projection lens is adapted to project the image upon a secondary screen 22.

In actual use of the invention, utilizing the method just described, the image from the film is reflected downwardly from the prism onto the reflecting surface 16 into the reduction lens, and hence again reflected by the surfaces 20' into the projection lens and onto the screen 22. The main image passes directly through the two prisms, the main projections lens and onto the main screen. This particular system has been actually used and measurements have shown that not more than 5 per cent. light loss is entailed in projecting the picture onto the main screen. As stated in the objects, it is possible to use the invention in such a manner that while a given motion picture is being projected upon the main screen of the theatre, that portions of said picture during said projection of the picture may be projected intermittently, at the will of the operator, onto a secondary screen located either in front of the theatre, in a store, or elsewhere, for the purpose of stimulating business. People outside the theatre may therefore see the actual picture in whole or in part. The question of sound is not detailed for this particular arrangement, but it is apparent that this would only entail the provision of a secondary speaker for the secondary screen.

Referring to Figures 6 and 7, I have shown diagrammatically, adaptations of the prisms for television purposes. In Figure 6, I have provided a lamp house 23, and I may likewise provide a projection head through which strip film 24 is to be passed. As was the case for the adaptation of the invention shown in Figure 4, this film passes between the source of light of the lamp house and the film gate 25. The lens system 12 is secured adjacent the gate and the reflecting surface 26 is immediately below the prism. A main lens 27 is adapted to project a picture from the film onto a screen 28. The secondary projection is received upon the reflecting surface 26 and after passing through the projection head, is focused on a light modulating element 29. This light modulating element is commonly called in the art a Karolus cell. After passing through the said cell, the beam of light is in the path of a scanning disc 30 of conventional construction. From the scanning disc, the light passes through a lens 31, which lens focuses the beam upon a photo-cell 32. By this system, it is possible by projecting a given picture upon a main screen in a motion picture theatre, to broadcast the picture by television methods on a television channel. Or, if desired, the television picture may be conveyed in the usual manner, such as over a telephone or telegraph wire.

In Figure 7, I have shown at 33 a lamp house. Motion picture strip film is shown at 34, which is forward of the lamp house and between the lamp house and a projection head 35. Within the projection head and adjacent the film gate is the prism system 12 and immediately beneath the said prism system is a reflecting surface 36. As before, I provide a main projection lens 37 whereby a picture may be projected onto a main screen 38. The secondary light beam from the said prism is passed through a modulating cell 39, thence through a duplicate prism system 12 which, in this respect, differs in arrangement from the first prism system, in that the light ray after passing through the reduction lens, is focused against the face 4 of the prism 1, the ray emitting from the face 3 of the prism 2. This arrangement does not direct the light ray downwardly in the first passage of said light ray through both said prisms. The light ray after passing directly through both prisms passes through a ground glass 40, behind which is a cathode ray tube 41 and the said beam is again directed from said cathode ray tube back through the ground glass, onto the surface 3 of the prism 2, whereupon the said ray is in turn reflected downwardly the same as it would be for the first prism arrangement 12, and into a photo-electric cell 42. As before, the picture is projected directly upon the main screen 38 and in turn the secondary light beam is passed through a further prism system, the reverse of the prism system first shown, so that the said secondary beam is affected by the cathode ray tube in the usual manner, and then redirected onto the photo-electric cell. Obviously, such a system does away with the scanning disc in the well understood manner or use for cathode ray tubes. As the scanning disc and cathode ray methods of television are well understood in the art, detailed descriptions of the operation thereof will not be given.

Referring to Figure 1, I have therein illustrated diagrammatically a dual negative sound recording, using the light valve system. This system, of course produces what is known as a variable density sound track. More particularly, Figure 1 illustrates in part the Western Electric system now in general use for the recording of sound. Briefly, the said system includes a source of light 43 projected upon a condensing lens system 44, and from said condensing lens system to the light valve 45. As a matter of fact, 45 is intended to illustrate the light valve ribbons and the slit that is therebetween. After the light has passed through the said slit, it is received upon an objective lens system 46. From the objective lens system, the light is usually focused, in an optical system of this character, upon the plane of an image on the film. However, with my system, it is focused upon the surface 3 of the prism 2 and the light is then directed in two paths, known as the main path 47 and onto a film 48, while a secondary beam 49 is received upon a film 50. In this way, I accomplish dual negative sound recording.

In Figure 2, I have illustrated a dual negative sound recording, utilizing the prisms 12. This system, without the prisms, is commonly known in the trade as "Movietone". The Movietone method utilizes a slit of constant area and a varying light, termed the "Aerolight". The Aerolight is a gaseous discharge tube which varies its illumination in accordance with the amplified-speech currents actuating it. At the present time, it contains two elements, to-wit, a nickel anode, and the other element a looped film coated with barium and strontium. Also, said tube is filled with some inert gas, such as helium. This Aerolight is shown at 51, and light therefrom is received upon a lens 52 and said lens focuses the said light on a quartz slit 53. Usually from the quartz slit, the beam is impressed directly upon a negative film. However, in the present instance, said beam is focused upon the prism system 12 with the result that the said beam is provided with a primary and secondary beam 54 and 55, and which beams are individually impressed upon negative films at 56 and 57.

In Figure 3, I have illustrated diagrammatically the Radio Corporation of America system of sound recording, said system incorporating the prisms of the invention. 58 is a pre-focused exposure lamp, the beam from which is directed on a spherical lens 59, in the plane of which is a light stop 60. From the light stop, light is received upon a galvanometer lens 61, thence directed onto a galvanometer mirror 62. The said mirror is carried by a galvanometer vibrator 63. From the said mirror, the light is directed through a lens system 64. This lens system usually comprises a scale, cylindrical lens, and spherical lens. After passing through the lens system, the beam is passed through an aperture 65, thence into a microscope objective 66, through the prism system 12 and divided into two rays, to-wit, a primary and secondary, and onto negative films 67 and 68. 69 is a view screen.

As an example of a sound arrangement utilizing the prisms, and particularly for the form of the invention illustrated in Figure 4, I may say that sound for the secondary screen picture may be provided in several different manners, such as by an auxiliary hook-up with existing sound systems which has heretofore been mentioned; by a microphone placed in the path of existing sounds; by induction coupling or induction coil, antenna coil pick-up within the field of the existing sound amplifier; or by ground potential pick-up. I may utilize an auditorium or concert type of alternating current loud speaker for exterior or lobby locations, while a medium volume speaker is utilized for interiors. The amplifier required might be a three-stage audiofrequency amplifier using preferably one —80 full-wave rectifier tube; one —27 detector amplifier tube, and three —45 push-pull power tubes. Where several speakers are used on the same circuit, more power is necessary, and an audioamplifier with two —81 half-wave rectifier tubes, one —24 amplifier tube, one —45 and two —50 push-pull power tubes will be adequate in such cases. The loud speaker may be placed adjacent the secondary screen with the usual baffle housing.

It is obvious that various other modifications and variations and interrelations of parts, members and features may be arranged for said prism system other than those illustrated in the drawings without, however, departing from the spirit of the invention, such changes readily suggesting themselves to one skilled in the art.

I claim:

1. In an optical system of the character disclosed, a source of light having a directed light beam, a pair of prisms in contiguous relationship, one of said prisms having an incident beam receiving face normal to the axis of the light beam, said prism having a light transmitting and reflecting surface, the refracting angle between said two faces being 38°, the other of said prisms having a light incident receiving face adjacent the light transmitting and reflecting face of the first prism, and a beam emergent face parallel to the incident beam receiving face of the first prism, the refracting angles between the two faces of said second prism being 38°.

2. In an optical system of the character disclosed, a source of light having a directed light beam, a pair of prisms in contiguous relationship, one of said prisms having an incident beam receiving face normal to the axis of the light beam, said prism having a light transmitting and reflecting surface, the refracting angle between said two faces being 38°, the other of said prisms having a light incident receiving face adjacent the light transmitting and reflecting face of the first prism, a beam emergent face parallel to the incident beam receiving face of the first prism, the refracting angles between the two faces of said second prism being 38°, a pair of spaced apart lens members, the axis of one of which is normal to the beam emergent face of the second prism, and a plane light reflecting surface at an angle to the beam emergent face of the first prism and the second lens member.

3. In an optical system of the character disclosed, a source of light having a directed light beam, a pair of prisms, one member of said pair having a light incident receiving face normal to the axis of the light beam, a light transmitting and reflecting face for the prism, the refracting angle between said faces being 38°; said second prism having a light transmitting face and a beam emergent face, the refracting angle therebetween being 38°; a lens normal to the beam emergent face of the second prism; a plane reflecting face at an angle to the beam emergent face of the first prism, and a second lens having its optical axis directed toward the plane reflecting face.

4. In an optical system, a source of light having a directed light beam, a pair of prisms formed of glass having like characteristics, one of said prisms having its incident beam receiving face normal to the axis of said source of light, said prism having a light transmitting and reflecting face, the angle between said face and the incident beam receiving face having a refracting angle of 38°, an emergent beam face for said prism, the base angle of which is 54° for crown glass, the other of said prisms having a light incident face and an emergent beam face, the angle of refraction therebetween being 38°, and said light incident beam receiving face being contiguous to the light transmitting and reflecting face of the first prism, and whereby the beam of light may be directed through said prisms in two directions of substantially equal light intensity.

EARLE R. HARPER.